Patented July 13, 1926.

1,592,386

UNITED STATES PATENT OFFICE.

WALTER SCHOELLER, OF BERLIN-WESTEND, AND KURT SCHMIDT, OF BERLIN-FRIEDENAU, GERMANY, ASSIGNORS TO CHEMISCHE FABRIK AUF ACTIEN (VORM. E. SCHERING), OF BERLIN, GERMANY.

POLY-IODINATED ISATINES AND PROCESS OF MAKING THE SAME.

No Drawing. Application filed November 24, 1925, Serial No. 71,217, and in Germany December 10, 1924.

Our invention refers to new chemical products and to the process of making same. It more particularly relates to poly-iodine substituted isatin which has not hitherto been obtained by direct iodination. The mono iodo isatin is alone known. We have however now succeeded in producing a 5.7-di-iodo isatin and 4.5.6.7-tetra-iodo-isatin.

Both these bodies are simultaneously obtained when two molecules of iodine chloride are caused to react upon one molecule of isatin, preferably in concentrated mineral acid. When the product of the reaction is poured into a large quantity of ice water 5.7-di-iodo isatin and 4.5.6.7-tetra-iodo-isatin of a high degree of purity precipitate with a good yield after standing for a short time and can easily be separated owing to their different solubilities.

Example.

To 3.7 grams isatin, dissolved in 80 ccm. concentrated hydrochloric acid, is added a solution of 8 grams iodine chloride in 25 ccm. concentrated hydrochloric acid and the mixture poured after standing for one hour at room temperature into 4 litres ice water. The proportion by molecules is preferably, though not necessarily about one molecule of isatin to two molecules of iodine chloride. On standing for about half an hour a reddish grey very fine precipitate occurs, which rapidly become greater, while the dark brown coloured liquid becomes lighter. After standing for one day precipitation is complete. The precipitate is filtered off and steam distilled for removing the excess of iodine. The residue remaining in the distillation flask is then treated with an excess of cold very dilute caustic soda (about ½ per cent). The greater part easily passes into solution; the smaller part with some difficulty. The yellow coloured solution of the sodium salt of poly-iodinated isatins is immediately acidified with sulphurous acid, whereupon an abundant quantity of an orange red body is precipitated. The body is not however uniform as on recrystallizing from hot alcohol it is apparent that the larger portion is fairly soluble while the smaller portion dissolves with difficulty.

The boiling hot alcoholic solution containing the more easily soluble portion is treated with boiling water until it remains cloudy, and is then allowed to cool. Small, orange-red hexagonal leaves separate out which decompose at about 234° C. and which appear by analysis to be 5.7 di-iodide isatin, having the following formula:

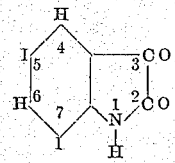

The compound is easily soluble in diluted alkali, glacial acetic acid and in hot alcohol.

The boiling alcoholic solution containing the very difficultly soluble portion separates out on cooling beautiful colourless long needles which decompose at about 190° C. and give by analysis figures agreeing with a 4.5.6.7-tetra-iodide isatin which has the following formula.

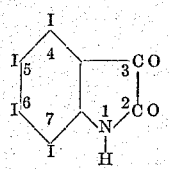

and which is fairly easily soluble in hot glacial acetic acid and acetic ester and fairly difficultly soluble in dilute alkali.

The isatin poly-iodide serves as a primary material for the preparation of pharmaceutical preparations.

We wish it to be understood that the production of the new compounds is not limited to the exact proportions and operations described, for obvious modifications will occur to a person skilled in the art.

We claim:—

1. As new products poly-iodinated isatins obtained by the action of two molecules of iodine chloride upon one molecule of isatin.

2. As a new product the 5,7-di-iodide of isatin, forming orange-red hexagonal leaves which decompose at about 234° C., being easily soluble in diluted alkali, glacial acetic acid and hot alcohol.

3. As a new product the 4,5,6,7-tetra-iodide of isatin, forming colourless long needles, which decompose at about 190° C., being fairly easily soluble in hot glacial acetic acid and acetic ester and fairly difficultly soluble in dilute alkali.

4. The process of making poly-iodinated isatines which consists in causing two molecules of iodine chloride to react upon one molecule of isatin.

5. The process of making poly-iodinated isatines which consists in causing a solution of two molecules of iodine chloride to react upon a solution of one molecule of isatin in concentrated mineral acid.

6. The process of making poly-iodinated isatines which consists in causing a solution of two molecules of iodine chloride to react upon a solution of one molecule of isatin in concentrated hydrochloric acid.

7. The process of making poly-iodinated isatines which consists in causing a solution of two molecules of iodine chloride to react upon a solution of one molecule of isatin in concentrated mineral acid, pouring the product of the reaction into ice water and separating the 5,7-di-iodide from the 4,5,6,7-tetra iodide of isatin.

In testimony whereof we affix our signatures.

WALTER SCHOELLER.
KURT SCHMIDT.